Sept. 19, 1933.  W. LINDSAY  1,927,710
HAND TRUCK
Filed Feb. 27, 1932   2 Sheets-Sheet 1

William Lindsay Inventor

By C.A.Snow&Co.
Attorneys.

Sept. 19, 1933.  W. LINDSAY  1,927,710
HAND TRUCK
Filed Feb. 27, 1932   2 Sheets-Sheet 2
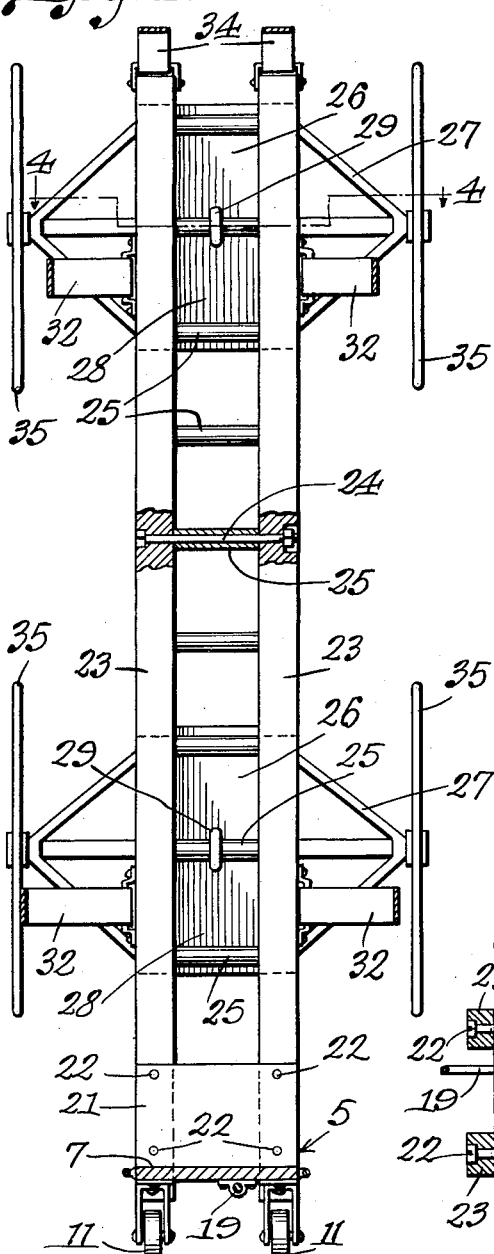
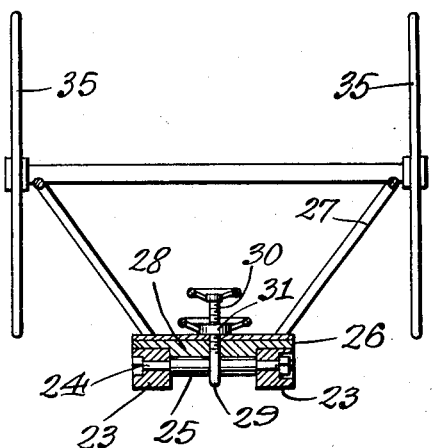
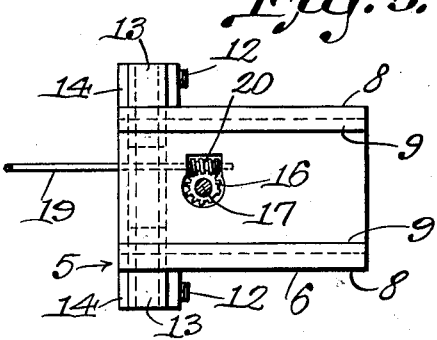
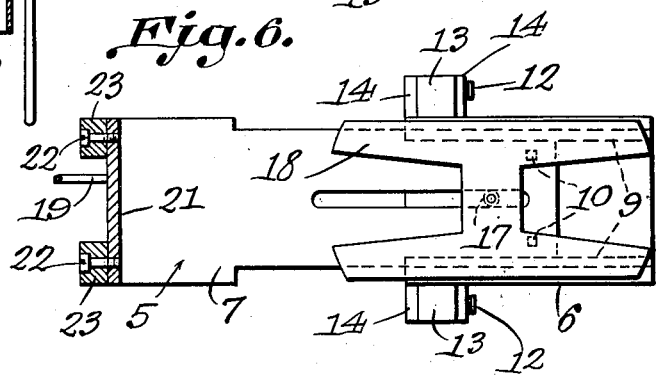
William Lindsay Inventor
By C. A. Snow & Co.
Attorneys.

Patented Sept. 19, 1933

1,927,710

UNITED STATES PATENT OFFICE 1,927,710

HAND TRUCK

William Lindsay, Madisonville, Ky.

Application February 27, 1932. Serial No. 595,550

2 Claims. (Cl. 280—49)

This invention has reference to hand trucks designed primarily for use in transporting and handling electric refrigerators, ice boxes or the like.

An important object of the invention is to provide a truck of this character embodying an adjustable base which may be adjusted to accommodate refrigerators of various sizes.

Another object of the invention is the provision of a base having a vertically adjustable platform, which may be operated to raise or lower the load to facilitate the positioning of the refrigerator in restricted locations.

A further object of the invention is to provide wheels which may be readily removed and replaced when it is desired to remove the refrigerator from the truck to the building in which the refrigerator is to be positioned.

A still further object of the invention is the provision of skids on which the load is supported while in transit, eliminating any possibility of the device shifting to damage the refrigerator.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a front elevational view of the truck.

Figure 4 is a sectional view taken on line 4—4 of Figure 2.

Figure 5 is a fragmental plan view of the base.

Figure 6 is a plan view illustrating the sections of the base as extended to accommodate a substantially wide refrigerator.

Figure 7 is a sectional view taken at right angles to Figure 4.

Figure 1:
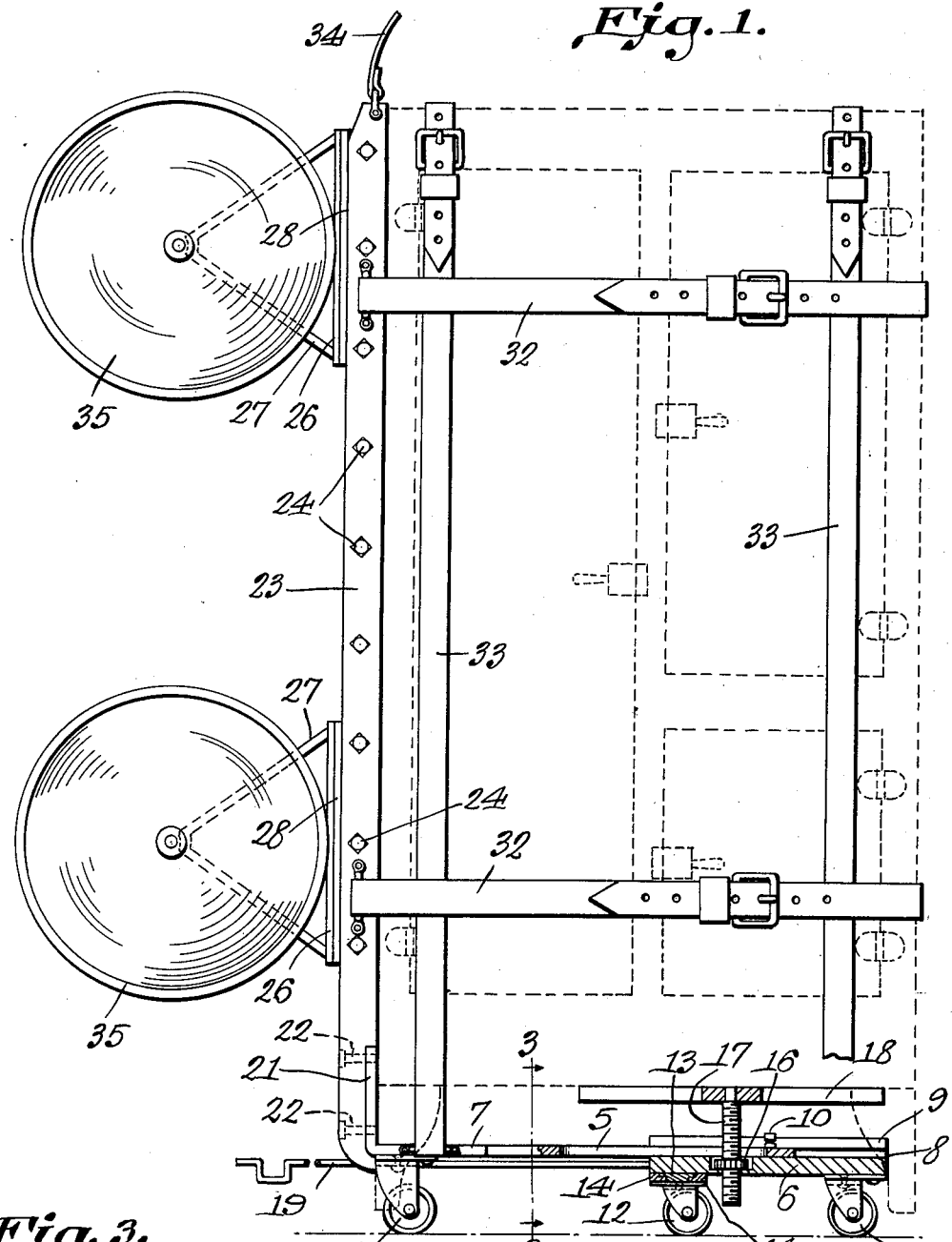
Figure 1 is an elevational view illustrating a refrigerator as secured to the truck.
Figure 3:
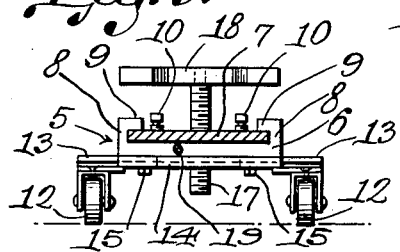
Figure 3 is a sectional view taken on line 3—3 of Figure 1.

Referring to the drawings in detail, the base of the truck is indicated generally by the reference character 5, and includes sections 6 and 7 respectively. The section 6 is formed with upstanding flanges 8 that have inwardly extended portions 9 defining grooves in which the section 7 of the base moves.

Thus it will be seen that an adjustable base is provided, so that refrigerators of various sizes may be conveniently carried on the base. Set screws indicated by the reference character 10 are carried by the section 7 and act to secure the sections 6 and 7 of the base, in their positions of adjustment.

Casters 11 are secured to the base near the front and rear ends thereof, while the casters 12 are supported at a point intermediate the ends of the base, as clearly shown by Figure 1 of the drawings. These casters 12 are supported on the bars 13 that have adjustable connection with the members 14 secured to the under side of the section 6, so that the casters 12 may be extended laterally to positions beyond the side edges of the base, to prevent the loaded truck from tilting laterally, while being moved along on the casters 11 and 12.

Set screws 15 cooperate with the bars 13 and members 14, to secure the casters 12 in their positions of adjustment. Mounted in the section 6 of the base, is a pinion 16 which is formed with internal threads that accommodate the screw 17, on which the platform 18 is mounted. This platform 18 is formed with cut out portions so that an operating rod indicated at 19 is provided and carries a worm 20 on its inner end, which worm meshes with the pinion 16 to rotate the pinion and raise or lower the screw 17 and platform mounted thereon.

It might be further stated that the section 7 of the base is formed with an elongated opening disposed intermediate the side edges thereof, through which opening the screw 17 passes, the opening permitting of longitudinal movement of the sections with respect to each other.

The forward end of the section 7 extends upwardly as at 21, where it is supplied with openings to receive the securing bolts 22, which bolts pass through the skids 23 for securing the skids to the base.

As shown, the skids 23 are of lengths to extend appreciable distances above the base, so that they will contact with the refrigerator supported by the truck, throughout the entire height of the refrigerator.

Bolts 24 extend through openings in the skids to hold the skids against spreading, while the tubular members 25 which are mounted on the bolts, have their ends in contact with the inner sides of the skids, to hold the skids in proper spaced relation with respect to each other.

These skids are provided as a support for the truck and refrigerator mounted thereon, while the refrigerator is in transit, the skids providing means to prevent movement of the truck and its load under normal conditions, to insure against damage to the refrigerator, but at the same time permit the truck and its load to be readily slid from its position on the carrier transporting the device.

Should it be desired to move the truck and refrigerator supported thereby, trucks 26 are provided, which trucks comprise frames 27 and plates 28, the plates 28 being formed with grooves spaced apart to permit the plates to be positioned against the tubular members of the skids, at any desired location along the skids.

Each of these trucks carries a hook member 29 that is adapted to hook over one of the tubular members 25, the hook members being provided with threaded portions 30 to receive the nuts 31, to draw the hook members 29 into close engagement with the tubular members, securing the trucks to the skids.

Thus it will be seen that these trucks may be readily and easily removed or replaced.

Straps 32 are secured to the skids near the upper and lower ends thereof, which straps are designed to extend around the refrigerator to secure the refrigerator against movement on the truck.

Vertical straps 33 connect with the base and are adapted to extend over the upper end of the refrigerator to hold the refrigerator in position.

Pull straps 34 are provided at the free ends of the skids, and afford means whereby the truck and its load may be pulled along on the wheels 35 that are mounted on the axles of the truck 27.

It might be further stated that the casters as well as the wheels 35, are provided with cushion tires. In the use of the device, assuming that a refrigerator is to be positioned on the truck, the platform 18 is lowered so that the truck may be slid under the refrigerator.

The rod 19 is now operated to elevate the platform until the platform contacts with the refrigerator, whereupon further movement of the platform will elevate the legs of the refrigerator to a position in spaced relation with the supporting surface.

When it is desired to position the refrigerator, the truck is moved to the proper position, and the platform is lowered until the legs of the refrigerator contact with the supporting surface.

The straps may now be released and the truck moved from its position under the refrigerator.

Having thus described the invention what is claimed.

1. In a truck of the class described, a base, skids rising from the base, bolts for securing the skids in spaced relation with each other, removable wheeled trucks having grooves, and said bolts being fitted in the grooves to removably secure the trucks to the skids.

2. In a truck of the class described, a base, skids rising from one end of the base, bolts for securing the skids in spaced relation with respect to each other, removable trucks having grooves to receive the bolts, hook members extended through the removable trucks and adapted to hook over certain of the bolts to secure the removable trucks to the skids, and means for drawing the hooks into close engagement with the bolts engaged thereby.

WILLIAM LINDSAY.